(12) United States Patent
Kurose et al.

(10) Patent No.: US 7,701,511 B2
(45) Date of Patent: Apr. 20, 2010

(54) DIGITAL TELEVISION BROADCAST SIGNAL RECEIVER

(75) Inventors: Takahiro Kurose, Daito (JP); Takahiro Katayama, Daito (JP); Toshihiro Takagi, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 1042 days.

(21) Appl. No.: 11/402,896

(22) Filed: Apr. 13, 2006

(65) Prior Publication Data

US 2006/0232705 A1 Oct. 19, 2006

(30) Foreign Application Priority Data

Apr. 13, 2005 (JP) ............................ 2005-115403

(51) Int. Cl.
 *H04N 5/44* (2006.01)
 *H04N 5/46* (2006.01)
 *H04N 11/00* (2006.01)

(52) U.S. Cl. ....................... 348/465; 348/468; 348/461; 348/569; 348/555

(58) Field of Classification Search ................. 348/465, 348/468, 461, 569, 460, 555; 725/136, 137
See application file for complete search history.

(56) References Cited

U.S. PATENT DOCUMENTS

| 7,430,016 B2 * | 9/2008 | Park ........................... 348/468 |
| 2002/0122136 A1 | 9/2002 | Safadi et al. |

FOREIGN PATENT DOCUMENTS

| JP | 7-177438 A | 7/1995 |
| JP | 7-177442 A | 7/1995 |
| JP | 2003-9096 A | 1/2003 |

* cited by examiner

*Primary Examiner*—David L Ometz
*Assistant Examiner*—Jean W Désir
(74) *Attorney, Agent, or Firm*—Crowell & Moring LLP

(57) ABSTRACT

In a digital television broadcast signal receiver (TV receiver), when closed caption information of digital TV (DTV-CC) is detected, a DTV-CC logo (first annunciation image) 31 is displayed with superimposing on an image of TV program for announcing that the DTV-CC is included in the digital TV signal, and when closed caption information of NTSC (NTSC-CC) is detected, an NTSC-CC logo (second annunciation image) 32 is displayed with superimposing on the image of TV program for announcing that the NTSC-CC is included in the digital TV signal. Thus, a user can easily recognize whether the DTV-CC and/or NTSC-CC are/is included in the digital TV signal or not.

2 Claims, 7 Drawing Sheets

DIGITAL TELEVISION BROADCAST SIGNAL RECEIVER

BACKGROUND OF THE INVENTION

1. Field of the Invention

The present invention relates to a closed-captioned digital television broadcast signal receiver.

2. Description of the Related Art

Conventionally, closed-captioned digital television broadcast signal receivers (hereinafter, abbreviated as digital TV receiver) extracts caption information from digital television broadcast signal (hereinafter, abbreviated as digital TV signal) and displays the caption information with superimposing it on an image of a TV program on a monitor screen of display apparatus.

In the United States, standards of the closed caption are established in EIA-608 and EIA-708, so that each TV station delivers TV signal in compliance with these standards for enabling to display the closed caption on the TV receivers.

Furthermore, Japanese Laid-Open Patent Publication No. 2003-9096 discloses another conventional TV receiver that can adjust various parameters which define a format for displaying the closed caption. For example, EIA-708 establishes a specification that a part of parameters can optionally be defined by a user through the TV receiver. In such parameters, font type, font size, foreground color, background color, edge color, edge type, foreground opacity, and background opacity are included. Each parameter further includes a plurality of selectable elements. In the digital TV receiver in compliance with EIA-708, the format of the closed caption can optionally be changed with adjusting these parameters.

Besides, the digital TV signal may include NTSC caption information formed in compliance with NTSC (National Television System Committee) system other than digital TV closed caption information in compliance with the digital TV system. Although the conventional digital TV receiver can extract the caption information from the digital TV signal and output the caption information which is superimposed on the image of TV program on the monitor display apparatus, it is difficult to the user to distinguish which of the digital TV caption information and the NTSC caption information is outputted on the monitor display. The digital TV system can allocate the data to the caption information much more than the NTSC system. Furthermore, the closed caption in compliance with EIA-708 can set various parameters on the user side. Thus, it is important to enable the distinction which of the digital TV caption information and the NTSC caption information is displayed on the monitor display in order to improve the operationality of the TV receiver.

SUMMARY OF THE INVENTION

A purpose of the present invention is to provide a digital television broadcast signal receiver that can easily distinguish whether the digital TV signal of a TV program which is viewed by the user includes the digital TV caption information and/or the NTSC caption information or not.

A digital television broadcast signal receiver in accordance with an aspect of the present invention comprises:

a closed caption information detection means for detecting whether closed caption information of digital television and/or closed caption information of NTSC (National television System Committee) are/is included in digital television broadcast signal or not;

a closed caption information extraction means for extracting the closed caption information of digital television and/or the closed caption information of NTSC, when the closed caption information of digital television and/or the closed caption information of NTSC are/is included in the digital television broadcast signal;

a display means for displaying an image of TV program;

a first annunciation image output control means for displaying a first annunciation image for announcing a fact that the closed caption information of digital television is detected with superimposing on the image of TV program, when the closed caption information of digital television is detected with the closed caption information extraction means; and a second annunciation image output control means for displaying a second annunciation image for announcing a fact that the closed caption information of NTSC is detected with superimposing on the image of TV program, when the closed caption information of NTSC is detected with the closed caption information extraction means.

With such a configuration, when the closed caption information of digital television (hereinafter, abbreviated as DTV-CC) is detected with the closed caption information detection means, the first annunciation image showing the fact that the DTV-CC is detected is outputted with superimposing on the image of television (TV) program, and when the closed caption information of NTSC (hereinafter, abbreviated as NTSC-CC) is detected with the closed caption information detection means, the second annunciation image showing the fact that the NTSC-CC is detected is outputted with superimposing on the image of TV program. Thus, the user can easily recognize whether the DTV-CC and/or NTSC-CC are/is included in the digital TV signal or not.

In the above mentioned configuration, it is preferable that the closed caption information extraction means directly refers visual data included in the digital television broadcast signal without referring to program transmission control data included in the digital television broadcast signal so as to detect whether the closed caption of digital television and/or closed caption of NTSC are/is included in the visual data or not.

With such a configuration, the existence or nonexistence of the closed caption information can be detected precisely even when the description of the program transmission control data is wrong.

DETAILED DESCRIPTION OF THE EMBODIMENT

Figure 1:
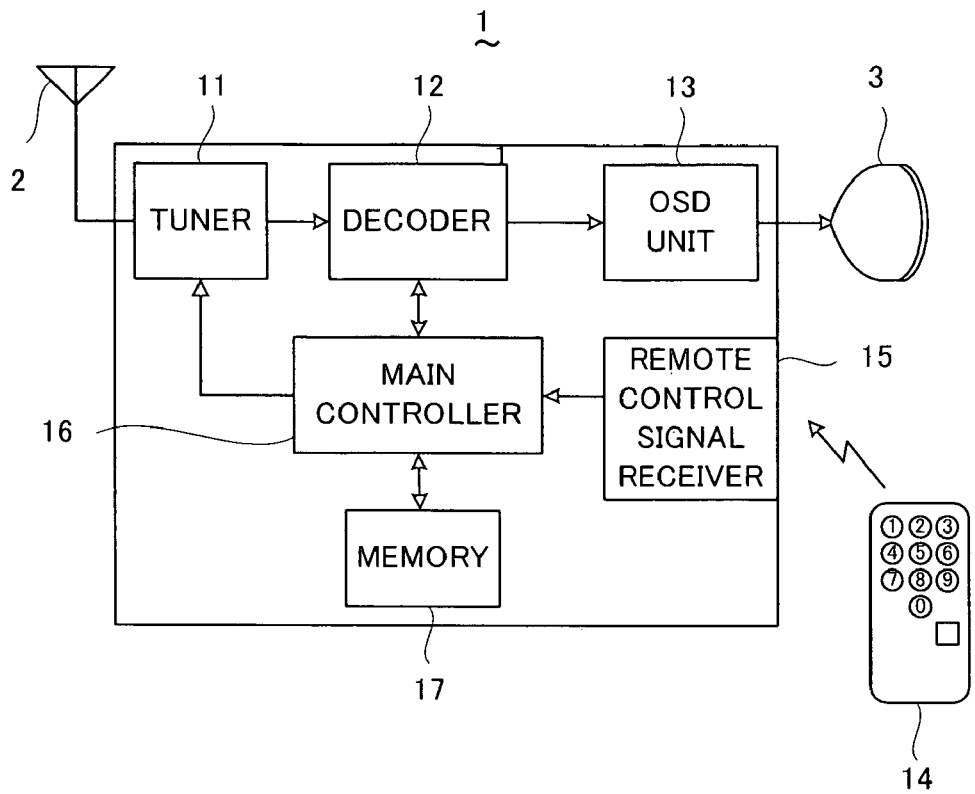
FIG. 1 is a block diagram showing a configuration of a digital TV receiver in accordance with an embodiment of the present invention.

A digital television broadcast signal receiver in accordance with an embodiment of the present invention is described with reference to the figures. FIG. 1 shows a block configuration of the digital television broadcast signal receiver (abbreviated as digital TV receiver) 1. The digital TV receiver 1 receives digital TV broadcast signal in compliance with ATSC (Advanced Television System Committee) through an antenna 2, and outputs audio and visual signals included in the received digital TV signal. Furthermore, the digital TV receiver 1 extracts closed caption information from the digital TV signal and outputs the closed caption information on a monitor screen of a monitor display apparatus with superimposing on an image of TV program.

The digital TV receiver 1 is comprised of a tuner 11 for receiving digital TV signal of a predetermined channel, a decoder 12 for processing the received digital TV signal, an on screed display (OSD) unit 13, a wireless remote control apparatus 14, a wireless remote control signal receiver 15, a main controller 16 for controlling entire of the digital TV receiver 1, and a memory 7 for storing various information.

The tuner 11 selects an appointed channel by tuning receiving frequency thereof to frequency of an appointed channel, performs decoding and error correction of the received digital TV signal, and outputs TS (Transport Stream) packets. The decoder 12 is comprised of an audio and visual decoding unit for decoding the TS packets including the audio and visual signals, and closed caption information decoding unit for decoding the TS packets including closed caption information and extracting the closed caption information.

Figure 2:
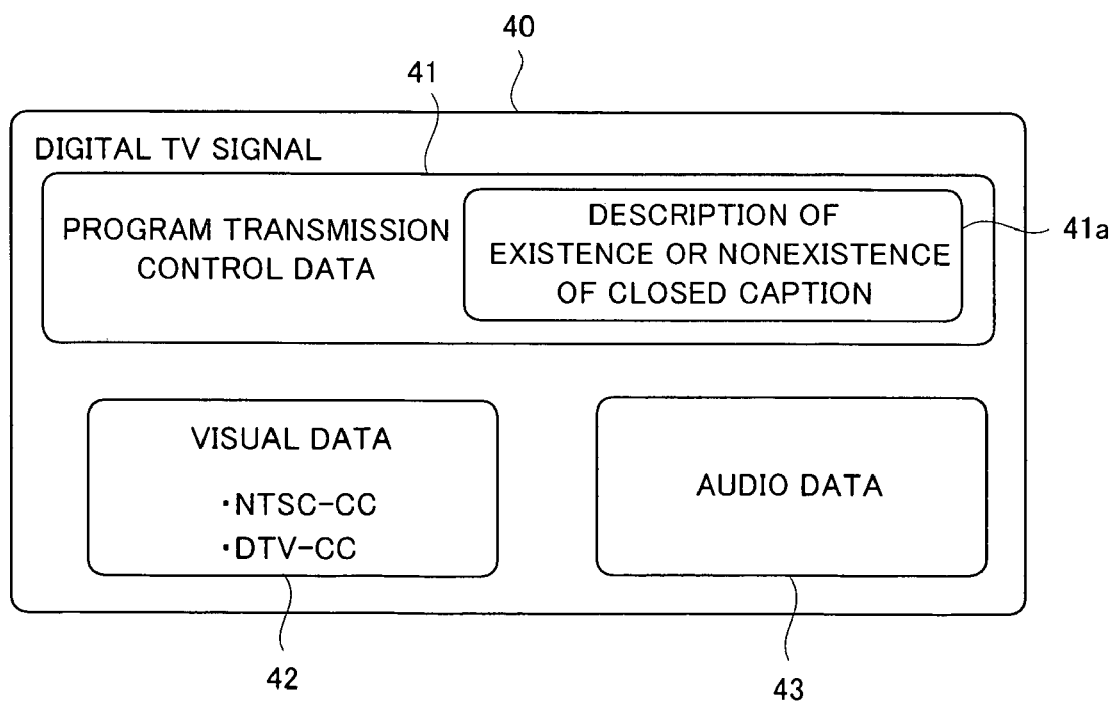
FIG. 2 is an explanatory diagram showing a configuration of a digital TV signal.

As can be seen from FIG. 2, the digital TV signal 40 includes program transmission control data 41 such as PSIP (Program and System Information Protocol), visual data 42 and audio data 43. In the digital TV of ATSC system, the closed caption information in compliance with EIA-708, that is the closed caption information of the digital TV (hereinafter, abbreviated as DTV-CC) and the closed caption information of NTSC (hereinafter, abbreviated as NTSC-CC) in compliance with EIA-608 are transmitted with the visual data 42. The program transmission control data 41 includes a description 41a showing whether the DTV-CC and/or the NTSC-CC exist/exists or not.

The audio and visual decoding unit of the decoder 12 performs decoding process of the TS packets including the audio and visual signals, and outputs the audio and visual signals to the monitor display apparatus which is connected to the digital TV receiver 1 through the OSD unit 13. The closed caption information decoding unit of the decoder 12 performs decoding process of the TS packets including the closed caption information and extracts the DTV-CC and/or the NTSC-CC when the DTV-CC and/or the NTSC-CC are/is included in the digital TV signal.

The OSD unit 13 outputs an image relating to the DTV-CC and/or NTSC-CC extracted with the closed caption information decoding unit of the decoder 12 in a predetermined format with superimposing on an image of TV program and provide a user interface when a user sets a format of the closed caption information.

The wireless remote control apparatus 14 comprises numerical keypads, cursor keys and a decision key which are operated by the user, and transmits a key operation signal corresponding to operations of these keys. The wireless remote control signal receiver 15 receives the key operation signal transmitted from the wireless remote control apparatus 14 and outputs a control signal corresponding to the key operation signal to the main controller 16.

The main controller 16 controls the entire of the digital TV receiver 1 and serves as an output control means for controlling the monitor output through the OSD unit 13. The main controller 16 further serves as a closed caption information detection means for detecting whether the DTV-CC and/or NTSC-CC are/is included in the digital TV signal of ATSC system or not by performing a process for displaying closed caption information which will be described later. In this embodiment, the main controller 16 directly refers to the visual data 42 included in the digital TV signal 40 without referring to the program transmission control data 41 so as to detect whether the DTV-CC and/or the NTSC-CC are/is included in the digital TV signal 40 or not.

Figure 6:
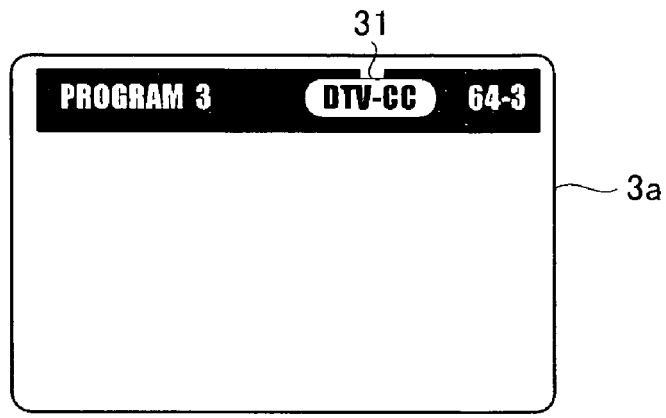
FIG. 6 is a chart showing examples of a monitor screen for displaying the closed caption information.
Figure 6:
Figure 6:
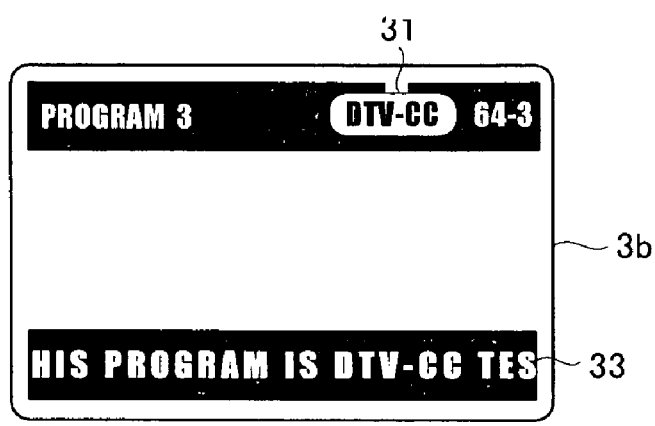
Figure 6:
Figure 6:
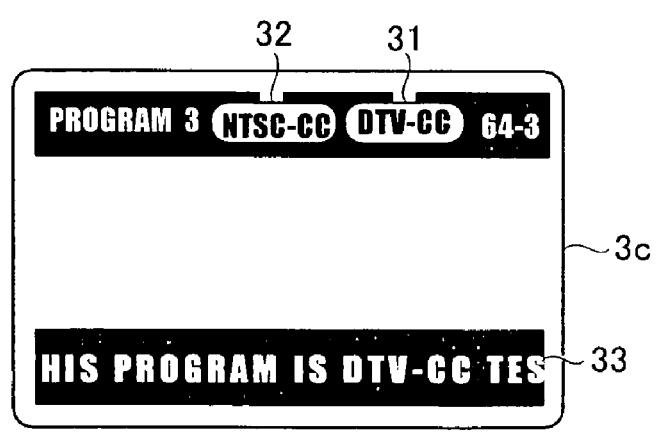
Figure 7:
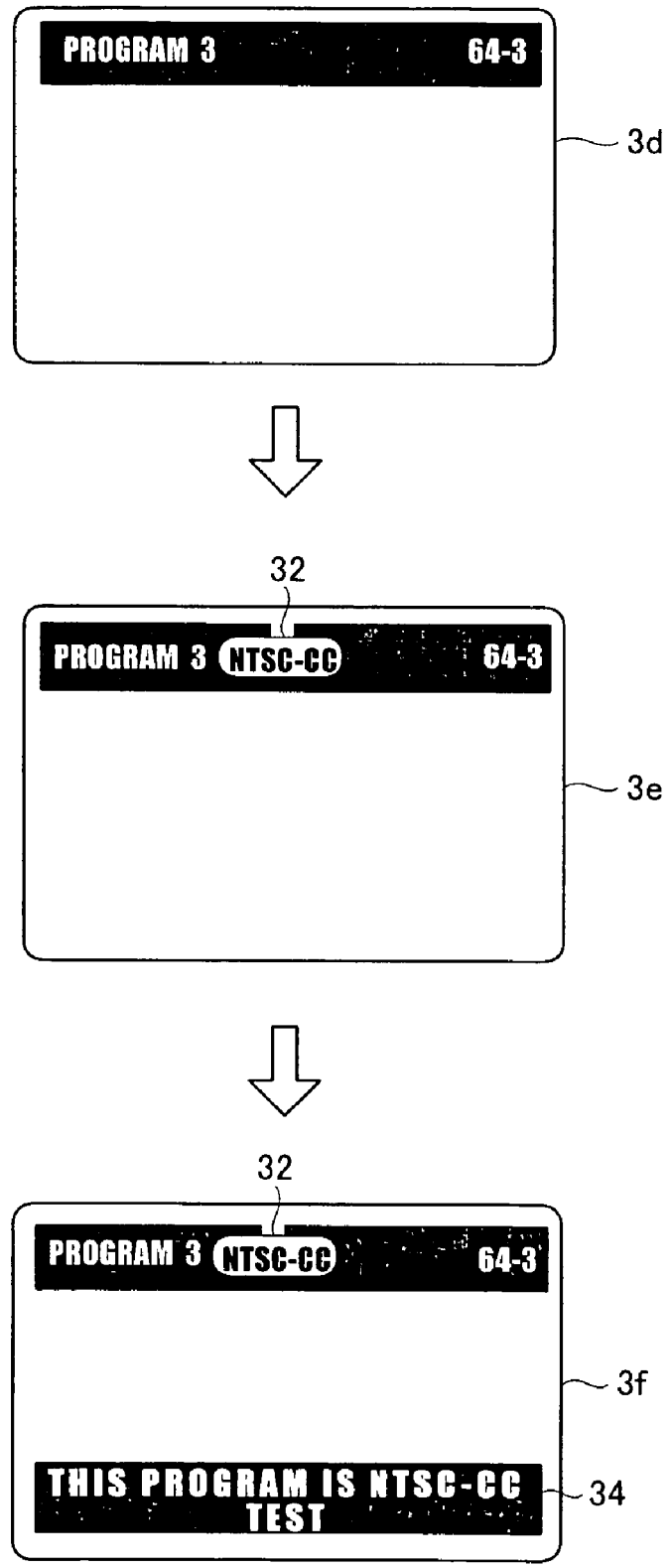
FIG. 7 is a chart showing other examples of the monitor screen for displaying the closed caption information.
Figure 8:
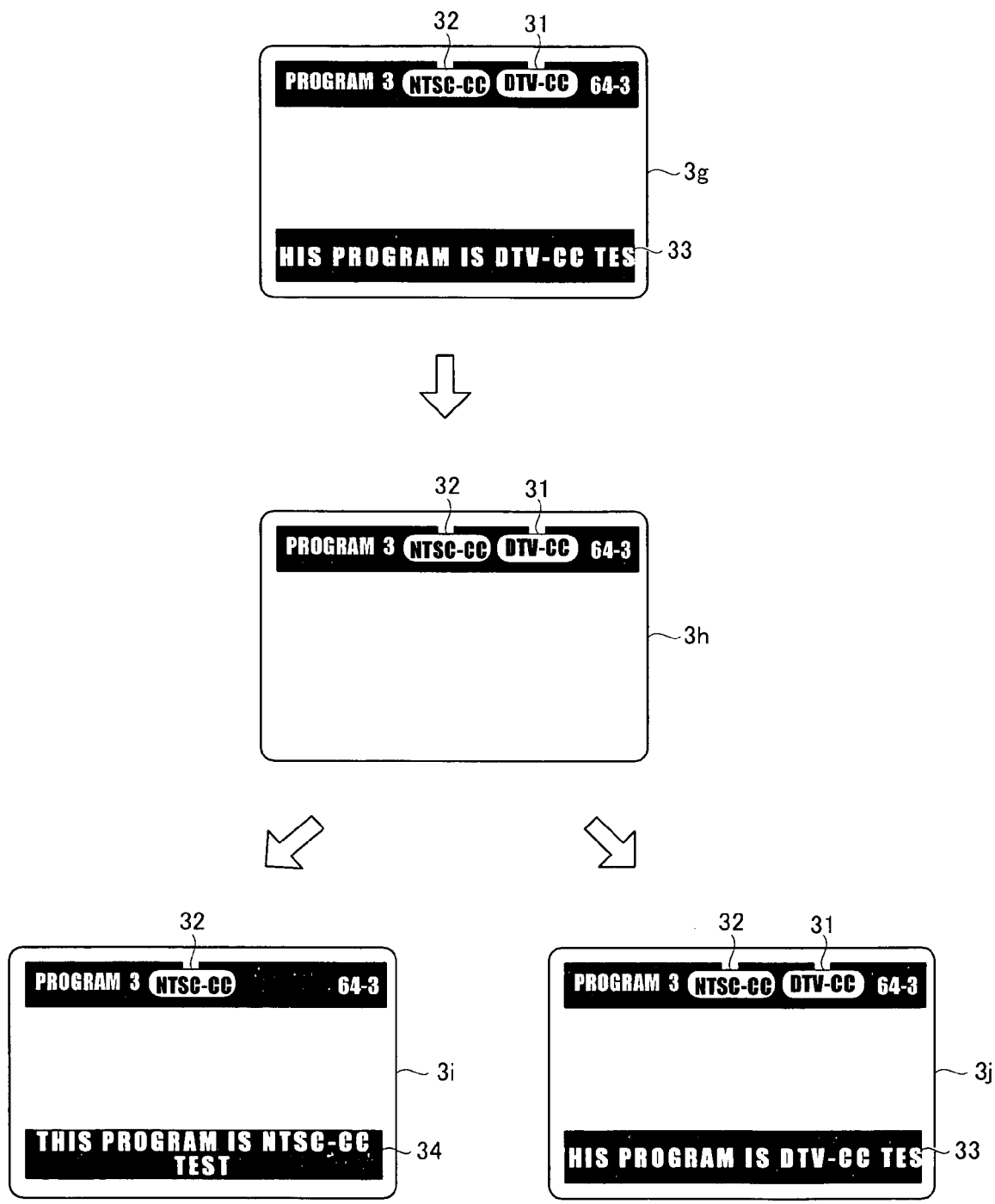
FIG. 8 is a chart showing still other examples of a monitor screen for displaying the closed caption information.

As shown in FIGS. 6 to 8, the main controller 16 still further serves as a first annunciation image output control means for outputting a DTV-CC logo (first annunciation image) 31 with superimposing on an image of TV program for announcing that the DTV-CC is detected to the user when the DTV-CC is detected, and serves as a second annunciation image output control means for outputting an NTSC-CC logo (second annunciation image) 32 with superimposing on an image of TV program for announcing that the NTSC-CC is detected to the user when the NTSC-CC is detected, by performing the process for displaying closed caption information.

The main controller 16 still further serves as a closed caption information output control means for outputting an image of DTV-CC 33 which is extracted with the decoder 12 on the monitor screen of the monitor display apparatus with superimposing on an image of TV program when the DTV-CC logo 31 is outputted, and for outputting an image of NTSC-CC 34 extracted with the decoder 12 on the monitor screen of the monitor display apparatus with superimposing on an image of TV program when the DTV-CC logo 31 is not outputted but only the NTSC-CC logo 32 is outputted.

Figure 3:
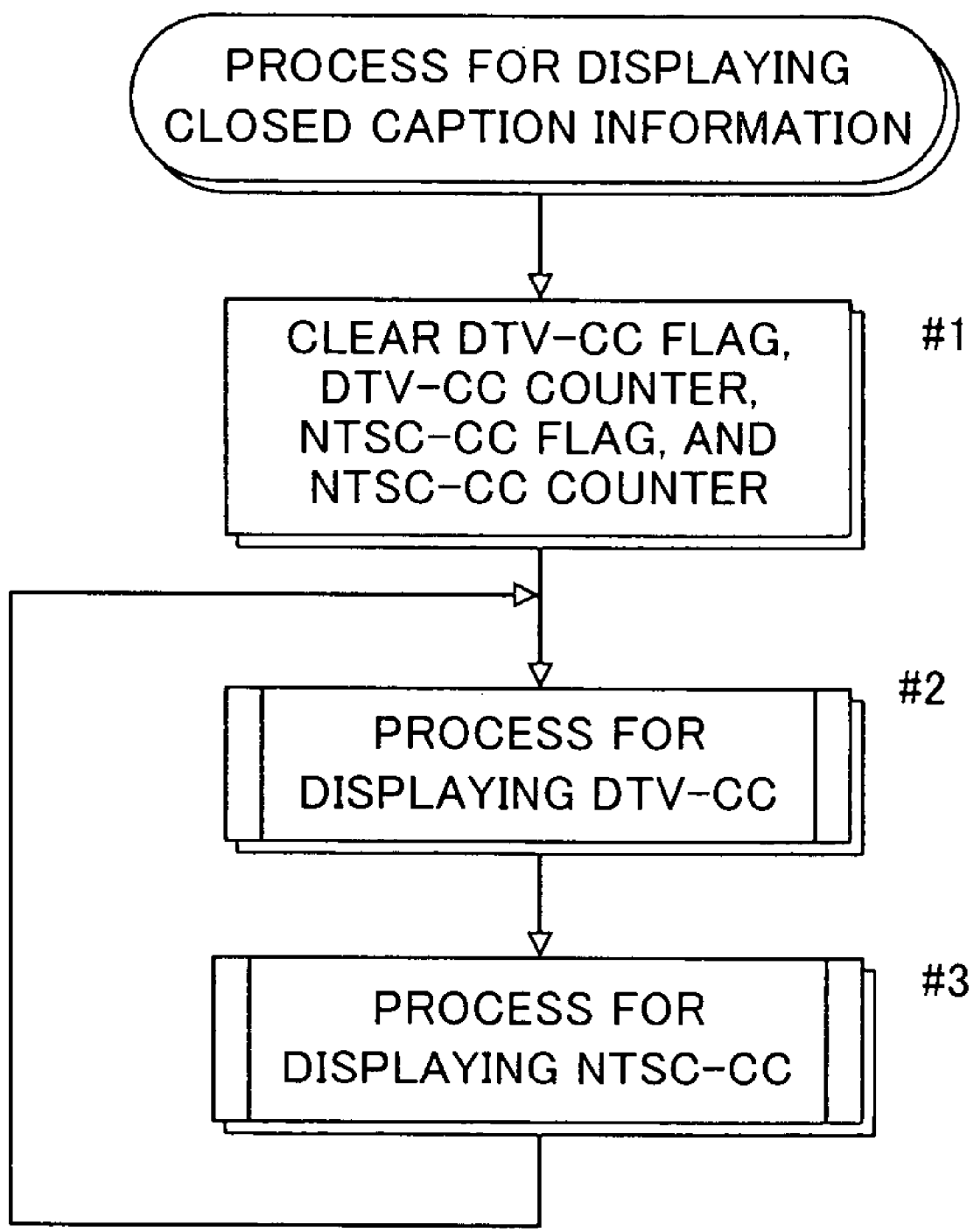
FIG. 3 is a flowchart showing a process for displaying closed caption information in the digital TV receiver.
Figure 4:
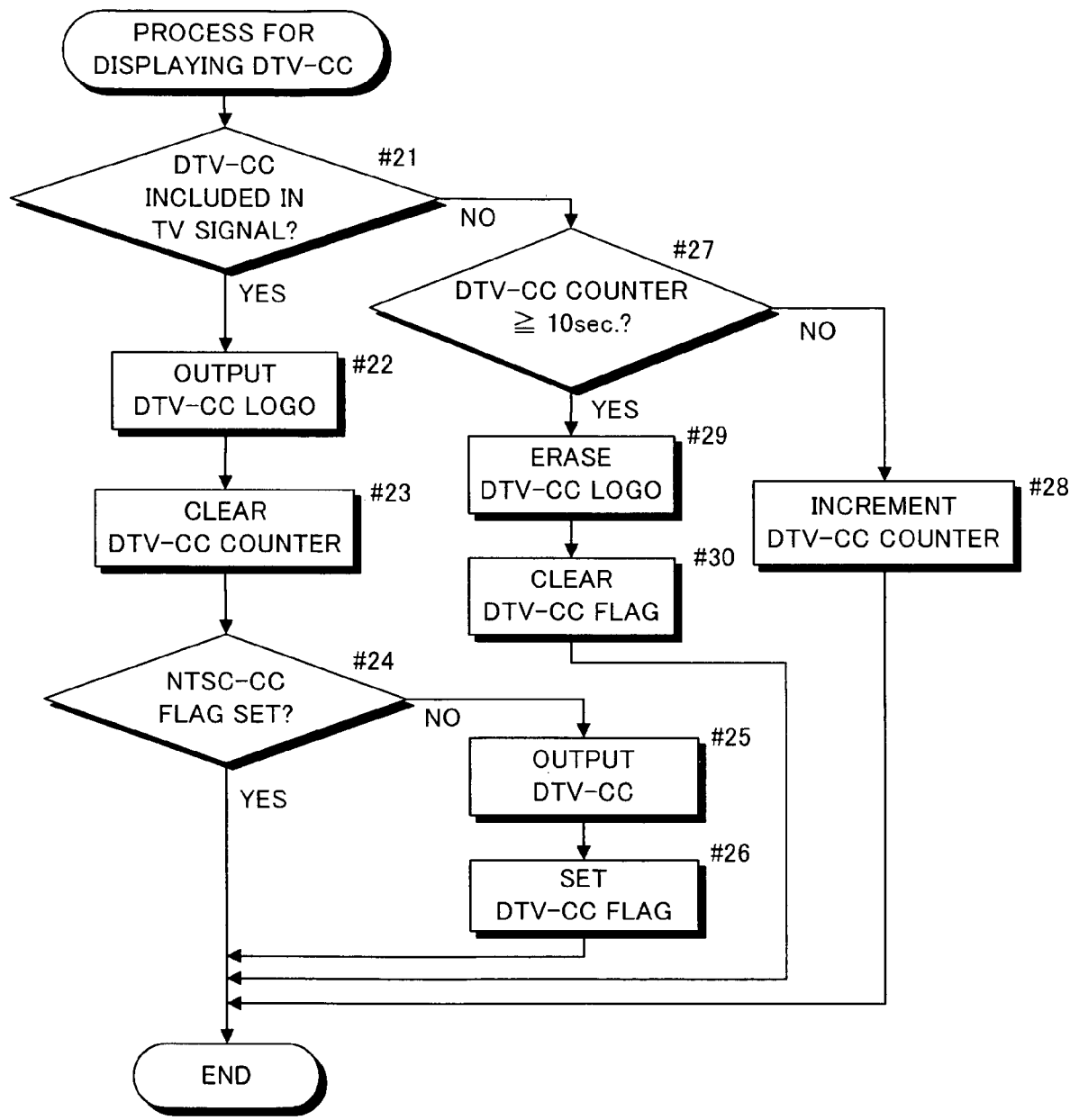
FIG. 4 is a flowchart showing a process for displaying closed caption information of digital television (DTV-CC) in the digital TV receiver.
Figure 5:
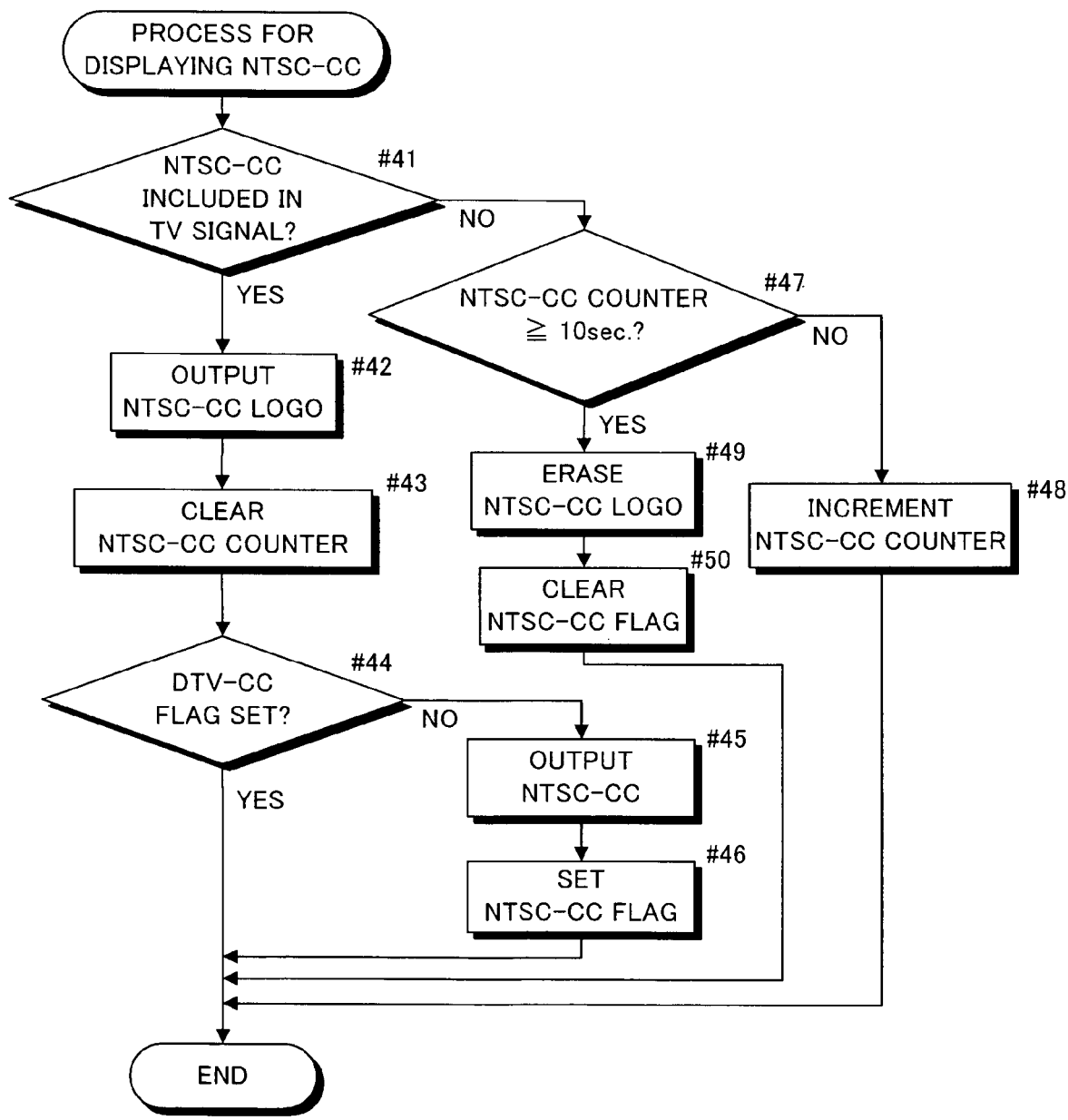
FIG. 5 is a flowchart showing a process for displaying closed caption information of NTSC (NTSC-CC) in the digital TV receiver.

Subsequently, the process for displaying the closed caption information is described with reference to flowcharts shown in FIGS. 3, 4 and 5. The process for displaying the closed caption information is always performed while the function of displaying the closed caption information of the digital TV receiver 1 is workable. When the process for displaying the closed caption information is started, the main controller 16 clears a DTV-CC flag showing whether the DTV-CC is outputted or not, an NTSC-CC flag showing whether the NTSC-CC is outputted or not, a DTV-CC counter showing a term from a time when the DTV-CC has not been detected, and an NTSC-CC counter showing a term from a time when the NTSC-CC has not been detected (#1). Then, the main controller 16 performs the process for displaying the DTV-CC (#2) and the process for displaying the NTSC-CC (#3), sequentially.

When the process for displaying the DTV-CC is started in the step #2, the main controller 16 judges whether the DTV-CC is included in the digital TV signal or not with reference to the visual data of the digital TV signal (#21). When the DTV-CC is included in the digital TV signal (YES in step #21), the main controller 16 outputs the DTV-CC logo to the monitor display apparatus through the OSD unit 13 (#22), and clears the DTV-CC counter (#23). Then, the main controller 16 further judges whether the NTSC-CC flag is set or not (#24). When the NTSC-CC flag is set (YES in step #24), the main controller 16 completes the process for displaying the DTV-CC. Alternatively, when the NTSC-CC flag is not set (NO in step #24), the main controller 16 outputs the DTV-CC to the monitor display apparatus (#25), and sets the DTV-CC flag (#26).

On the other hand, when the DTV-CC is not included in the digital TV signal (NO in step #21), the main controller 16 judges whether the counting value of the DTV-CC counter is equal to or larger than a predetermined term such as 10 seconds or not (#27). When the counting value of the DTV-CC counter is smaller than the predetermined term (NO in step #27), the main controller 16 increments the DTV-CC counter (#28). Alternatively, when the counting value of the DTV-CC counter is equal to or larger than the predetermined term (YES in step #27), the main controller 16 erases the DTV-CC logo (#29) and clears the DTV-CC flag (#30).

When the process for displaying the DTV-CC is completed, the main controller 16 performs the process for displaying the NTSC-CC, subsequently. The main controller 16 judges whether the NTSC-CC is included in the digital TV signal or not with reference to the visual signal of the digital TV signal (#41). When the NTSC-CC is included in the digital TV signal (YES in step #41), the main controller 16 outputs the NTSC-CC logo to the monitor display apparatus through the OSD unit 13 (#42), and clears the NTSC-CC counter (#43). Then, the main controller 16 judges whether the DTV-CC flag is set or not (#44). When the DTV-CC flag is set (YES in step #44), the main controller 16 completes the process for displaying the NTSC-CC. Alternatively, when the DTV-CC is not set (NO in step #44), the main controller 16 outputs the NTSC-CC to the monitor display apparatus (#45), and sets the NTSC-CC flag (#46).

On the other hand, when the NTSC-CC is not included in the digital TV signal (NO in step #41), the main controller 16 judges whether the counting value of the NTSC-CC counter is equal to or larger than a predetermined term such as 10 seconds or not (#47). When the counting value of the NTSC-CC counter is smaller than the predetermined term (NO in step #47), the main controller 16 increments the NTSC-CC counter (#48). Alternatively, when the counting value of the NTSC-CC counter is equal to or larger than the predetermined term (YES in step #47), the main controller 16 erases the NTSC-CC logo (#49) and clears the NTSC-CC flag (#50).

In case of, for example, including both of the DTV-CC and NTSC-CC in the digital TV signal, when the process for displaying the closed caption information is started, the main controller 16 clears the NTSC-CC flag and so on (#1), outputs the DTV-CC logo 31 to the monitor display apparatus (referring to the display screen 3a in FIG. 6) in the process for displaying the DTV-CC (#22), and clears the DTV-CC counter (#23). Since the NTSC-CC flag has been cleared in the above step #1 and has not been set (NO in step #24), the main controller 16 outputs the DTV-CC 33 to the monitor display apparatus (referring to the display screen 3b in FIG. 6) (#25), and sets the DTV-CC flag (#26).

Subsequently, the main controller 16 displays the NTSC-CC logo 32 (referring to the display screen 3c in FIG. 6) in the process for displaying the NTSC-CC (#42), and clears the NTSC-CC counter (#43). Since the DTV-CC flag has been set in the above step #26 (YES in step #44), the main controller 16 completes the process for displaying the NTSC-CC without outputting the NTSC-CC to the monitor display apparatus.

In case that the DTV-CC is not included but only the NTSC-CC is included in the digital TV signal (NO instep #21 and YES in step #41), the main controller 16 completes the process for displaying the DTV-CC without outputting the DTV-CC logo and the DTV-CC to the monitor display apparatus, in other words, with clearing the DTV-CC flag (referring to the monitor screen 3d in FIG. 7). Subsequently, the main controller 16 displays the NTSC-CC logo 32 (referring to the monitor screen 3e in FIG. 7) in the process for displaying the NTSC-CC (#42), and clears the NTSC-CC counter (#43). Since the DTV-CC flag has not beset (NO in step #44), the main controller 16 outputs the NTSC-CC to the monitor display apparatus (referring to the monitor screen 3f in FIG. 7) (#45), sets the NTSC-CC flag (#46) and completes the process for displaying the NTSC-CC.

In case that the DTV-CC has not be detected under a condition that the DTV-CC and NTSC-CC has been detected (referring to the monitor screen 3g in FIG. 8) (NO in step #21), the main controller 16 judges whether the counting value of the DTV-CC counter is equal to or longer than the predetermined term such as 10 seconds or not in the step #27 of the process for displaying the DTV-CC. When the counting value of the DTV-CC counter is shorter than the predetermined term (NO in step #27), the main controller 16 completes the process for displaying the DTV-CC with displaying the DTV-CC logo 31. At this time, since the DTV-CC is not included in the digital TV signal, the DTV-CC is not outputted to the monitor display apparatus (referring to the monitor screen 3h in FIG. 8). Subsequently, the main controller 16 clears the NTSC-CC counter (#43) with maintaining the display of the NTSC-CC logo 32 (#42) in the process for displaying the NTSC-CC. Since the DTV-CC flag has not been set (YES in step #44), that is, the DTV-CC flag has not been cleared in the step #30 until the counting value of the DTV-CC counter becomes equal to or larger than the predetermined term such as 10 seconds, the main controller 16 completes the process for displaying the NTSC-CC without outputting the NTSC-CC to the monitor display apparatus. Alternatively, when the counting value of the DTV-CC counter becomes equal to or larger than the predetermined term (YES in step #27), the main controller 16 erases the DTV-CC logo 31 (#29), clears the DTV-CC flag (#30) and outputs the NTSC-CC 34 to the monitor display apparatus (referring to the monitor screen 3i in FIG. 8) (YES in step #44 and #45). In addition, when the DTV-CC is detected again before the counting value of the DTV-CC counter becomes equal to or longer than the predetermined term (YES in step #21), the DTV-CC counter is cleared (#23) and the DTV-CC 33 is displayed (referring to the monitor screen 3j in FIG. 8).

According to the above mentioned digital TV receiver 1 in this embodiment, when the DTV-CC is detected while the process for displaying the closed caption information is performed, the DTV-CC logo for announcing the fact that the DTV-CC is detected to the user is outputted with superimposing on an image of TV program, and when the NTSC-CC is detected, the NTSC-CC logo for announcing the fact that the NTSC-CC is detected to the user is outputted with superimposing on the image of TV program. Thus, the user can easily recognize whether the DTV-CC and/or NTSC-CC are/is included in the digital TV signal of the TV program which the user has been viewed or not.

Furthermore, the visual data of the digital TV signal into which the closed caption information is included is directly referred instead of referring to the program transmission control data of the digital TV signal so as to detect whether the DTV-CC and/or the NTSC-CC are/is included in the visual data or not. Thus, even when the description of the program transmission control data is wrong, the existence or nonexistence of the closed caption information in the digital TV signal can be detected precisely.

Still furthermore, when both of the DTV-CC and NTSC-CC are detected, the DTV-CC in compliance with EIA-708 which can be changed the parameters on the user side is outputted preferentially, so that the closed caption information to which the user's preference is reflected by setting the parameters is preferentially displayed.

Still furthermore, even when the DTV-CC and/or NTSC-CC which has been detected are/is not detected, the output of the DTV-CC logo and/or the NTSC-CC logo is maintained until a predetermined term had passes. The DTV-CC logo and/or the NTSC-CC logo are/is not switched needlessly although the DTV-CC logo and/or the NTSC-CC logo are/is not detected temporality.

In addition, the present invention is not limited to the description of the above mentioned embodiment. For example, the closed caption information of digital TV is not formed necessarily in compliance with EIA-708, and the closed caption information of NTSC is not formed necessarily in compliance with EIA-608.

This application is based on Japanese patent application 2005-115403 filed Apr. 13, 2005 in Japan, the contents of which are hereby incorporated by references.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A digital television broadcast signal receiver comprising:
   a closed caption information detection means for detecting whether closed caption information of digital television and/or closed caption information of NTSC (National television System Committee) are/is included in digital television broadcast signal or not;
   a closed caption information extraction means for extracting the closed caption information of digital television and/or the closed caption information of NTSC, when the closed caption information of digital television and/or the closed caption information of NTSC are/is included in the digital television broadcast signal;
   a display means for displaying an image of TV program;
   a first annunciation image output control means for displaying a first annunciation image for announcing a fact that the closed caption information of digital television is detected with superimposing on the image of TV program, when the closed caption information of digital television is detected with the closed caption information extraction means;
   a second annunciation image output control means for displaying a second annunciation image for announcing a fact that the closed caption information of NTSC is detected with superimposing on the image of TV program, when the closed caption information of NTSC is detected with the closed caption information extraction means; and
   wherein:
   the closed caption information of digital television extracted with the closed caption information extraction means is outputted with superimposing on the image of television program to the monitor display apparatus when the first annunciation image is outputted;
   the closed caption information of NTSC extracted with the closed caption information extraction means is outputted with superimposing on the image of television program to the monitor display apparatus when the first annunciation image is not outputted but only the second annunciation image is outputted;
   when the closed caption information of digital television and/or the closed caption information of NTSC are/is not detected which have/has been detected with the closed caption information detection means, the first annunciation image output control means and the second annunciation image output control means maintain the output of the first annunciation image and/or the second annunciation image until a predetermined term passes from a time when the closed caption information of digital television and/or the closed caption information of NTSC are/is not detected; and
   when a state that the closed caption information of digital television and/or the closed caption information of NTSC are/is not detected is continued in the predetermined term, the first annunciation image output control means and the second annunciation image output control means stop to output the first annunciation image and/or the second annunciation image.

2. A digital television broadcast signal receiver comprising:
   a closed caption information detection means for detecting whether closed caption information of digital television formed in compliance with EIA-708 and/or closed caption information of NTSC (National Television System Committee) formed in compliance with EIA-608 are/is included in digital television broadcast signal of ATSC (Advanced Television System Committee) or not;
   a closed caption information extraction means for extracting the closed caption information of digital television and/or the closed caption information of NTSC from the digital television broadcast signal, when the closed caption information of digital television and/or the closed caption information of NTSC are/is included in the digital television broadcast signal;
   an output means for outputting an image or images with respect to the closed caption information of digital television and/or the closed caption information of NTSC with superimposing an image of TV program to a monitor display apparatus; and
   an output control means for controlling output to the monitor display apparatus with the output means; wherein
   the closed caption information detection means directly refers to visual data included in the digital television broadcast signal with out referring to program transmission control data included in the digital television broadcast signal so as to detect whether the closed caption information of digital television and/or the closed caption information of NTSC are/is included in the digital television broadcast signal or not;
   the output control means further comprises:
      a first annunciation image output control means for displaying a first annunciation image for announcing a fact that the closed caption information of digital television is detected with superimposing on the image of TV program, when the closed caption information of digital television is detected with the closed caption information extraction means;
      a second annunciation image output control means for displaying a second annunciation image for announcing a fact that the closed caption information of NTSC is detected with superimposing on the image of TV program, when the closed caption information of NTSC is detected with the closed caption information extraction means; and
      a closed caption information output control means for outputting the closed caption information of digital television extracted with the closed caption information extraction means with superimposing on the image of television program to the monitor display apparatus when the first annunciation image is outputted, and for outputting the closed caption information of NTSC extracted with the closed caption information extraction means with superimposing on the image of television program to the monitor display apparatus when the first annunciation image is not outputted but only the second annunciation image is outputted;

when the closed caption of digital television and/or the closed caption of NTSC are/is not detected which have/has been detected with the closed caption information detection means, the first annunciation image output control means and the second annunciation image output control means maintain the output of the first annunciation image and/or the second annunciation image until a predetermined term passes from a time when the closed caption of digital television and/or the closed caption of NTSC are/is not detected; and when a state that the closed caption of digital television and/or the closed caption of NTSC are/is not detected is continued in the predetermined term, the first annunciation image output control means and the second annunciation image output control means stop to output the first annunciation image and/or the second annunciation image.

* * * * *